US011894165B2

(12) United States Patent
Uki

(10) Patent No.: US 11,894,165 B2
(45) Date of Patent: Feb. 6, 2024

(54) BRAIDED PART CONNECTION STRUCTURE

(71) Applicant: YAZAKI CORPORATION, Tokyo (JP)

(72) Inventor: Kazutaka Uki, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/685,372

(22) Filed: Mar. 2, 2022

(65) Prior Publication Data

US 2022/0285047 A1 Sep. 8, 2022

(30) Foreign Application Priority Data

Mar. 3, 2021 (JP) ................................ 2021-033653

(51) Int. Cl.
*H01R 4/02* (2006.01)
*H01B 9/02* (2006.01)
*H01R 9/05* (2006.01)

(52) U.S. Cl.
CPC ............ *H01B 9/024* (2013.01); *H01R 4/023* (2013.01); *H01R 9/05* (2013.01)

(58) Field of Classification Search
CPC ............... H01R 4/02; H01R 4/60; H01R 9/05
See application file for complete search history.

(56) References Cited

U.S. PATENT DOCUMENTS 4,790,775 A 12/1988 David
5,024,608 A * 6/1991 Heng .................. H01R 9/0503 439/578
5,711,686 A * 1/1998 O'Sullivan ...... H01R 13/65918 439/607.41
5,994,646 A 11/1999 Broeksteeg et al.
6,123,556 A * 9/2000 Asakura ............. H01R 43/0207 29/863
6,254,404 B1 * 7/2001 Sedlecky ............... H01R 4/646 439/98
6,315,575 B1 * 11/2001 Kajimoto .............. H01L 31/188 136/256
10,008,307 B1 * 6/2018 Lanoe .................... H01B 7/295
10,283,712 B1 * 5/2019 Kasmai ............... H01L 51/0037
(Continued)

FOREIGN PATENT DOCUMENTS

CN 211700674 U 10/2020
EP 0839397 A1 5/1998
(Continued)

*Primary Examiner* — Chau N Nguyen

(74) *Attorney, Agent, or Firm* — KENEALY VAIDYA LLP

(57) ABSTRACT

A braided part connection structure includes a conductive braid and a conductive member electrically connected and fixed to the braid and made of a conductive plate material. The conductive member includes a braid joining portion. The braid joining portion includes, at a part of the conductive member in a longitudinal direction of the conductive member, a plurality of openings formed at intervals with each other along a direction intersecting the longitudinal direction and a welded portion defined by two adjacent openings of the plurality of openings. The braid joining portion is provided on the braid in an overlapping manner and the welded portion is laser-welded onto the braid.

5 Claims, 8 Drawing Sheets

(56) References Cited

U.S. PATENT DOCUMENTS

| | | | | |
|---|---|---|---|---|
| 2004/0011550 | A1* | 1/2004 | Imai | H05K 9/0018<br>174/74 R |
| 2007/0190868 | A1* | 8/2007 | De Cloet | H01R 13/6277<br>439/851 |
| 2012/0214339 | A1* | 8/2012 | Stein | H01R 13/6315<br>439/578 |
| 2012/0237787 | A1 | 9/2012 | Yoshida et al. | |
| 2014/0326501 | A1* | 11/2014 | Lienert | H01R 4/02<br>219/78.15 |
| 2019/0334296 | A1* | 10/2019 | Watkins | H01R 13/622 |

FOREIGN PATENT DOCUMENTS

| | | | | |
|---|---|---|---|---|
| GB | 2332992 | | * | 7/1999 |
| JP | 2009-272128 | | * | 11/2009 |
| JP | 5466194 | B2 | | 4/2014 |
| JP | 2017-208265 | A | | 11/2017 |
| WO | 97/04500 | A1 | | 2/1997 |
| WO | 2009/14010 | A1 | | 1/2009 |

* cited by examiner

BRAIDED PART CONNECTION STRUCTURE

CROSS-REFERENCE TO RELATED APPLICATION

The present application claims priority to Japanese Patent Application No. 2021-033653 filed on Mar. 3, 2021, the entire content of which is incorporated herein by reference.

TECHNICAL FIELD

The presently disclosed subject matter relates to a braided part connection structure.

BACKGROUND

In the related art, an end of an electric wire is crimped to be connected to a crimp portion of a terminal of a charging connector (see, for example, JP2017-208265A). It is also known that by locally irradiating laser light, both an electric wire and a conductive metal plate are melted and then solidified and joined together (see, for example, JP5466194B2).

Meanwhile, for the sake of prevention of electromagnetic interference, the electric wire connected to the terminal of the connector may be a shielded cable in which a shield braid is arranged on an outer periphery of a core wire of a main circuit. In this shielded cable, the shield braid is covered with an annular metal member and crimped to be connected to a shield terminal by hexagonal crimping or the like. However, this crimping method requires dedicated molds and tools for each electric wire and shield terminal having different diameters, and productivity thereof is bad.

In contrast, if the shield terminal and the shield braid are joined by a laser joining method of irradiating laser light and then welding, the number of jigs and the like to be used for the joining can be reduced, and a takt time required for joining can be shortened. However, since a flexible shield braid are woven with thin wires and thus has an unstable shape compared with a conductor of an electric wire and the like, it is difficult to laser-weld this type of shield braid and a conductive member such as a shield terminal with high joining accuracy. Moreover, when an overlapping portion of the shield braid and the conductive member is laser-welded, heat energy is transmitted from a welded portion to a periphery of the conductive member and the like and escapes. Therefore, an irradiation time and output power of the laser light for welding must be increased to address this problem of low efficiency.

SUMMARY

Illustrative aspects of the presently disclosed subject matter provide a braided part connection structure having high connection reliability, in which a conductive member and a braid are laser-welded with high accuracy.

According to an illustrative aspect of the presently disclosed subject matter, a braided part connection structure includes a conductive braid and a conductive member electrically connected and fixed to the braid and made of a conductive plate material. The conductive member includes a braid joining portion. The braid joining portion includes, at a part of the conductive member in a longitudinal direction of the conductive member, a plurality of openings formed at intervals with each other along a direction intersecting the longitudinal direction and a welded portion defined by two adjacent openings of the plurality of openings. The braid joining portion is provided on the braid in an overlapping manner and the welded portion is laser-welded onto the braid.

Other aspects and advantages of the presently disclosed subject matter will be apparent from the following description, the drawings and the claims.

BRIEF DESCRIPTION OF DRAWINGS

FIG. 6A and FIG. 6B are views illustrating a braided part connection structure according to modifications of the presently disclosed subject matter, in which FIG. 6A shows a main part perspective view illustrating a modification of the welded portion in the shield member, and FIG. 6B shows a main part perspective view illustrating another modification of the braid joining portion in the shield member;

FIG. 7A and FIG. 7B are views illustrating a braided part connection structure according to another embodiment of the presently disclosed subject matter, in which FIG. 7A shows a perspective view illustrating a connection terminal as a conductive member and a flexible conductor made of a braid, the connection terminal and the flexible conductor being separated from each other, and FIG. 7B shows a perspective view illustrating a state in which the connection terminal and the flexible conductor are joined together.

DESCRIPTION OF EMBODIMENTS

Figure 1:
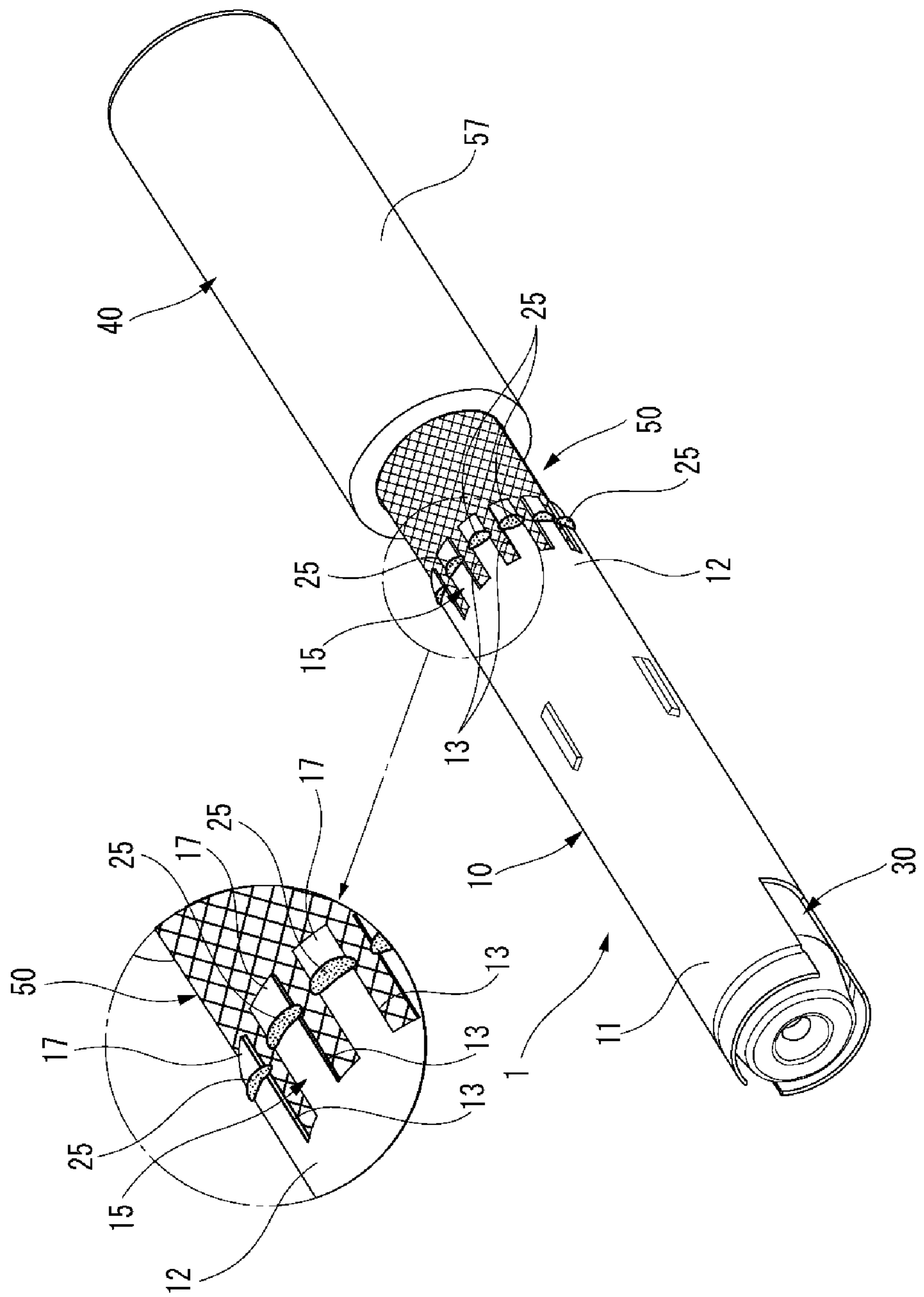
FIG. 1 is a view illustrating a braided part connection structure according to an embodiment of the presently disclosed subject matter, including a perspective view and a main part enlarged view illustrating a state in which a shield member as a conductive member in a shield assembly is connected to a shield braid made of a braid.
Figure 2:
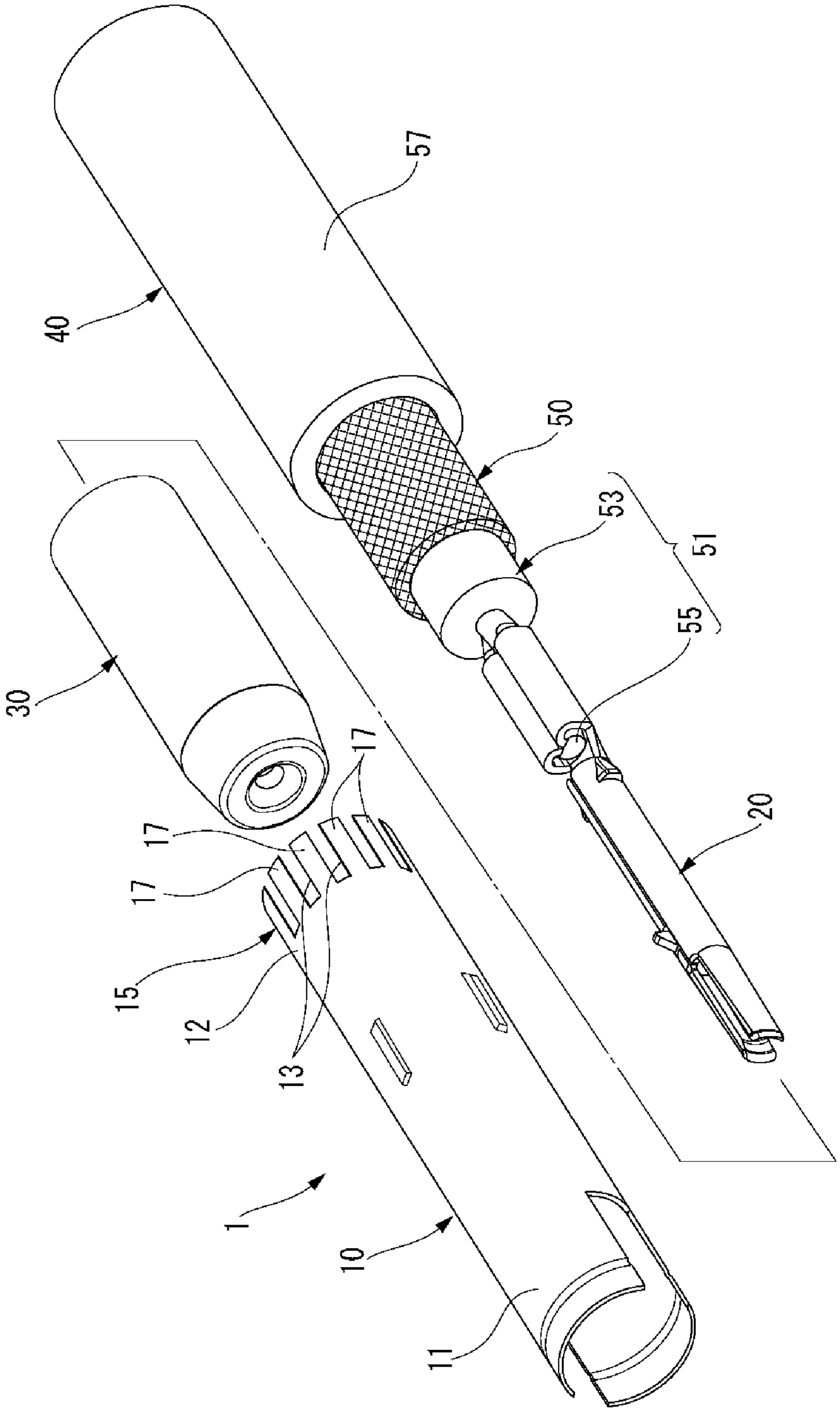
FIG. 2 is an exploded perspective view of the shield assembly illustrated in FIG. 1.

Hereinafter, embodiments according to the presently disclosed subject matter will be described with reference to the drawings. First, a braided part connection structure according to an embodiment of the presently disclosed subject matter will be described. FIG. 1 is a view illustrating the braided part connection structure according to the embodiment of the presently disclosed subject matter, including a perspective view and a main part enlarged view illustrating a state in which a shield outer terminal (shield member) 10, as a conductive member, is connected to a shield braid 50 made of a braid in a shield assembly 1. FIG. 2 is an exploded perspective view of the shield assembly 1 illustrated in FIG. 1.

As shown in FIGS. 1 and 2, the braided part connection structure according to the embodiment is, for example, a braided part connection structure used in the shield assembly 1 of a high frequency connector attached to an end of a shielded cable 40. The shield assembly 1 includes the cylindrical shield braid (braid) 50 that covers a periphery of an insulated wire (electric wire) 51 along a longitudinal direction of the insulated wire 51, and the shield outer terminal (conductive member) 10, which is a cylindrical shield member electrically connected and fixed to the shield braid 50.

The shielded cable 40 is a coaxial cable including the insulated wire 51 in which a core wire (conductor) 55 is covered with an insulator 53, the cylindrical shield braid 50 that covers the insulated wire 51 over the longitudinal direction, and an outer cover 57 that covers an outer periphery of the shield braid 50 (see FIG. 2). The conductive core wire 55 may be either a single wire or a stranded wire obtained by twisting a plurality of wires. The insulator 53 is electrically insulated and covers the core wire 55. In the present embodiment, the shielded cable 40 is presented as a coaxial cable including the shield braid 50, but other configurations may also be adopted as long as it is a cable including the shield braid 50.

The shield assembly 1 is to be accommodated in an outer housing (not shown) of the high frequency connector, which is made of a synthetic resin having an electrical insulation property. The shield assembly 1 is to be connected to the end of the shielded cable 40. The shield assembly 1 according to the embodiment includes an inner terminal 20, an inner housing 30, and the shield outer terminal (shield member) 10, which is a conductive member.

The inner terminal 20 is formed in a cylindrical shape by a conductive metal, and is electrically connected to the core wire 55 of the shielded cable 40 by crimping. The inner housing 30 is made of an electrically insulated synthetic resin, and the inner terminal 20 is accommodated and held in an inner terminal accommodating chamber of the inner housing 30.

The shield outer terminal 10 as a conductive member according to the embodiment is a shield member formed in a cylindrical shape and including an inner housing accommodating chamber that accommodates the inner housing 30. The shield outer terminal 10 is formed by pressing a conductive metal plate made of, for example, copper or a copper alloy. As shown in FIG. 2, the shield outer terminal 10, which is a shield member as a conductive member, includes a fitting end 11 on one end side. The fitting end 11 is to be fitted to a shield outer terminal of a mating element (not shown), which is a shield member of the mating element for the fitting end 11 and to be electrically connected to the shield outer terminal of the mating element. The shield outer terminal 10 includes a braid connection end 12 on the other end side, and the shield braid 50 is connected to the braid connection end 12.

As shown in FIG. 2, the shield outer terminal 10 includes a braid joining portion 15 formed with a plurality of openings 13 at the braid connection end 12 on the other end side of the shield outer terminal 10. The openings 13 are formed at intervals along a circumferential direction of the shield outer terminal 10. The braid joining portion 15 includes welded portions 17 formed between each two adjacent openings 13 in the circumferential direction. In other words, the welded portions 17 are defined by two adjacent openings 13. In the embodiment, each opening 13 of the braid joining portion 15 is a notched hole with an open end at the other end of the shield outer terminal 10, and the welded portions 17 are cantilevered protruding pieces formed between each two adjacent notched holes. Therefore, the braid joining portion 15 has a comb-teeth shape over the circumferential direction. Widths of the openings 13 and the welded portions 17 along the circumferential direction, and intervals between adjacent openings 13 and welding portions 17 are appropriately set depending on required strength, electrical resistance when being connected with the shield braid 50, and other conditions.

The shield braid 50 is a long braid obtained by braiding wires made of a conductive metal material such as copper or a copper alloy, and is formed in a cylindrical shape. The shield braid 50 is provided so as to cover the periphery of the insulated wire 51 over the longitudinal direction. The insulated wire 51 includes the core wire 55 inside of the insulator 53. The outer periphery of the shield braid 50 is covered with the outer cover 57, and an end of the shield braid 50 connected to the shield outer terminal 10 is to be exposed from the outer cover 57 (see FIGS. 1 and 2).

One end of the insulated wire 51 is inserted into the shield outer terminal 10 from the braid connection end 12. In this state, the braid joining portion 15 at the braid connection end 12 of the shield outer terminal 10 covers the end of the shield braid 50 and overlaps with the shield braid 50. In this case, an outer periphery of the end of the shield braid 50 is covered with the shield outer terminal 10.

At the braid joining portion 15 of the shield outer terminal 10 covering and overlapping with the shield braid 50, the welded portions 17 made of the protruding pieces are laser-welded on the shield braid 50 to form welded connection portions 25. Then, the shield outer terminal 10 and the shield braid 50 are electrically connected with each other at the welded connection portions 25, which are formed by laser-welding the welded portions 17.

Figure 3:
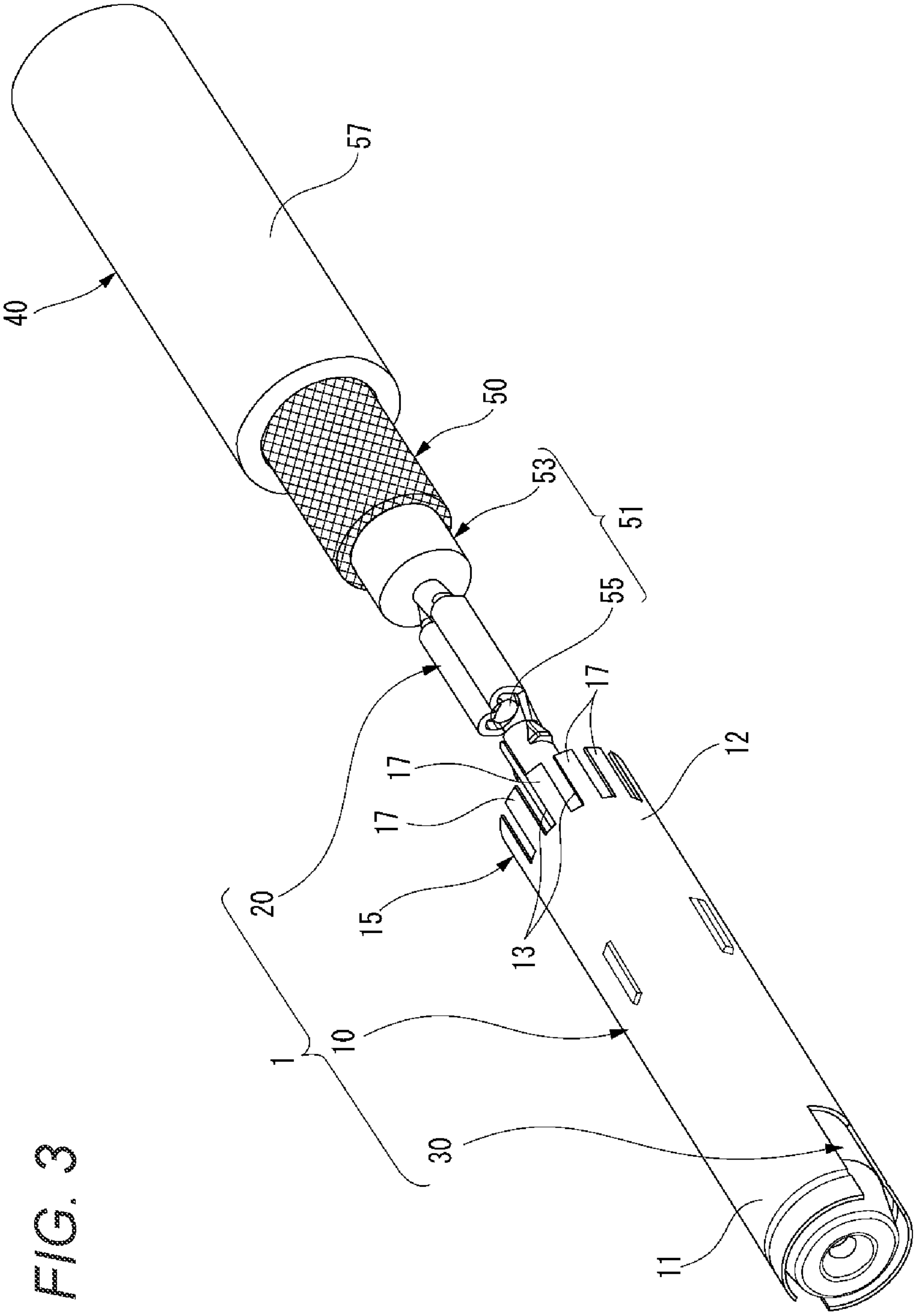
FIG. 3 is a perspective view illustrating a state immediately before the shield member gets connected to the shield braid.
Figure 4:
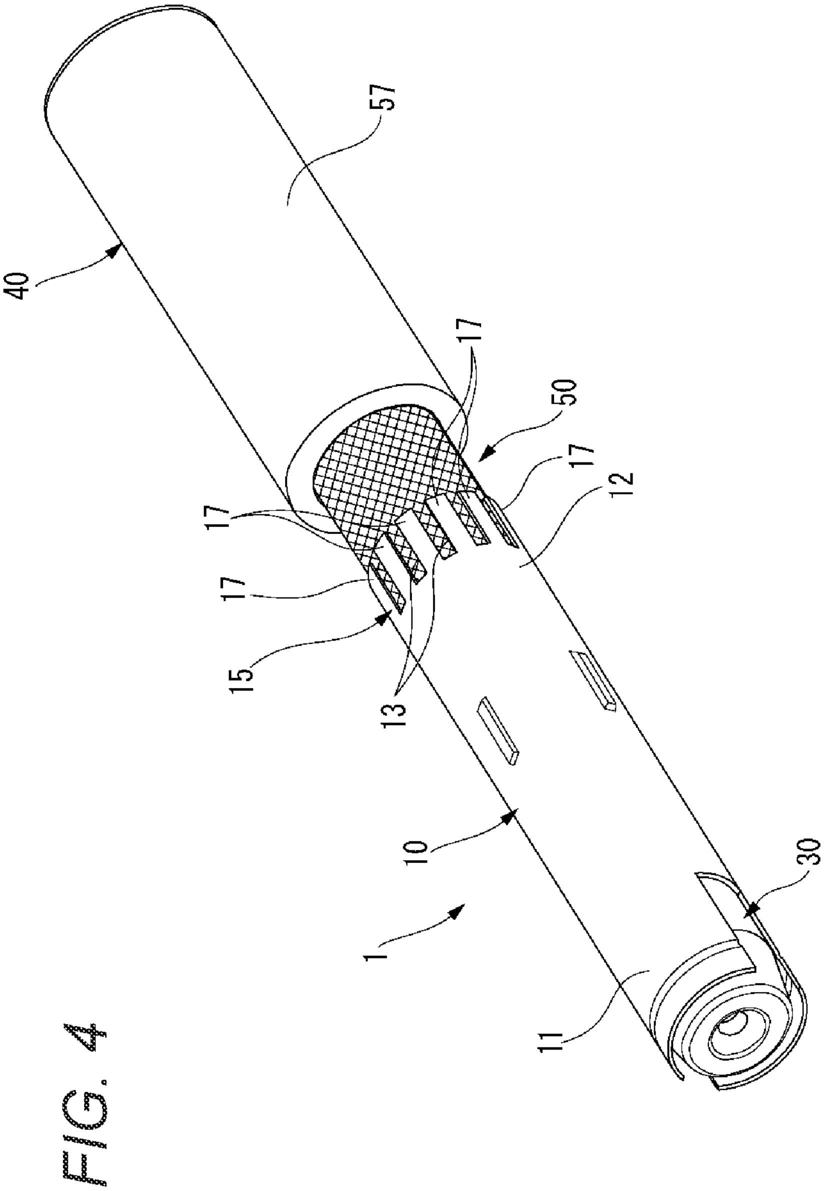
FIG. 4 is a perspective view illustrating a state in which a braid joining portion of the shield member covers and overlaps with the shield braid.
Figure 5A:
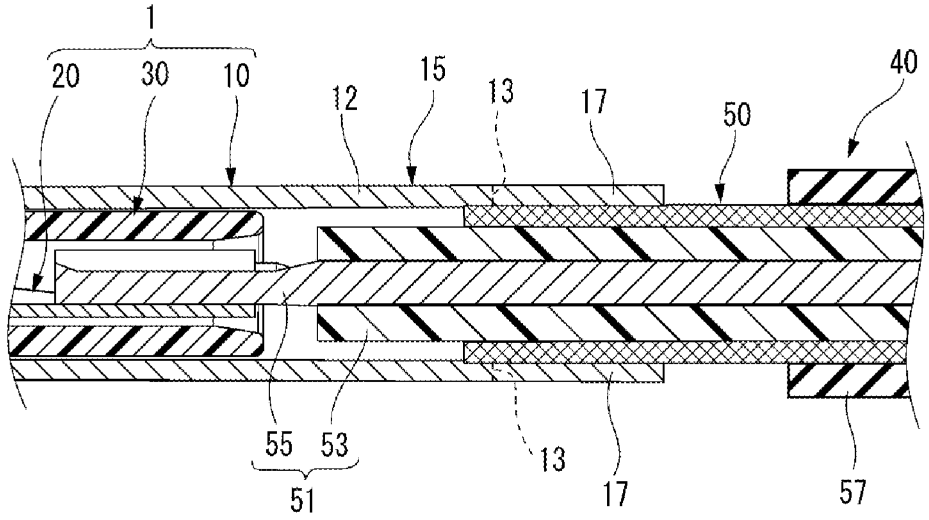
FIG. 5A is a vertical cross-sectional view illustrating the state in which the braid joining portion of the shield member covers and overlaps with the shield braid.

Next, how the shield braid 50 is connected to the shield outer terminal 10, which is a shield member as a conductive member, will be described. FIG. 3 is a perspective view illustrating a state immediately before the shield outer terminal 10, which is a shield member, is connected to the shield braid 50. FIG. 4 is a perspective view illustrating a state in which the braid joining portion 15 of the shield outer terminal 10 covers and overlaps with the shield braid 50. FIG. 5A is a vertical cross-sectional view illustrating the state in which the braid joining portion 15 of the shield outer terminal 10 covers and overlaps with the shield braid 50, and FIG. 5B is a vertical cross-sectional view explaining a process of welding the welded portions 17 onto the shield braid 50 covered and overlapped with the braid joining portion 15.

First, as shown in FIG. 3, the inner terminal 20 is accommodated in the inner terminal accommodating chamber of the inner housing 30, and the shield braid 50 is covered with the braid joining portion 15 of the shield outer terminal 10. Therefore, the inner terminal 20, the core wire 55, the insulator 53, and the shield braid 50 are inserted into the braid connection end 12 of the shield outer terminal 10. Then, as shown in FIGS. 4 and 5A, the end of the shield braid 50 is covered with the braid joining portion 15. In this way, the welded portions 17 made of the plurality of protruding pieces of the braid joining portion 15 overlap with the outer periphery of the end of the shield braid 50.

Figure 5B:
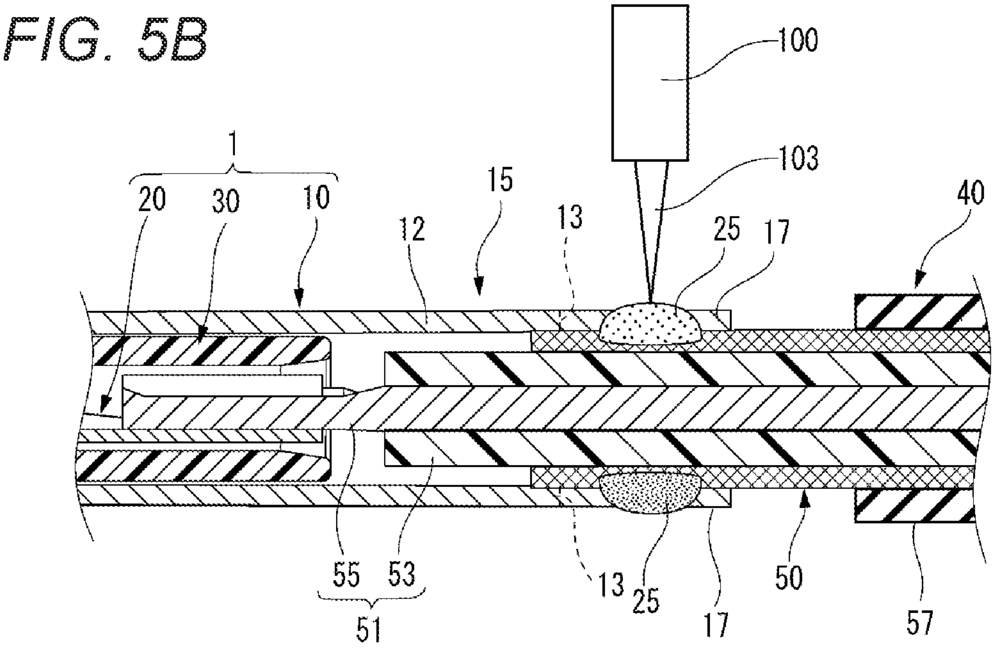
FIG. 5B is a vertical cross-sectional view explaining a process of welding a welded portion onto the shield braid covered and overlapped with the braid joining portion.

Next, as shown in FIG. 5B, an overlapping portion of each welded portion 17 with the shield braid 50 is irradiated with laser light 103 emitted by a laser irradiation device 100, and the welded portion 17 and the shield braid 50 are sequentially welded. In this case, by turning the laser irradiation device 100 on and off while rotating the shield assembly 1 and the shielded cable 40 around an axis, the laser light 103 is irradiated only on the welded portion 17. In this way, at the overlapping portions of the welded portions 17 with the shield braid 50, the welded connection portions 25 are sequentially formed by laser-welding the welded portions 17 onto the shield braid 50. As a result, the braid joining portion 15 of the shield outer terminal 10 is electrically connected to the end of the shield braid 50.

When connecting the braid joining portion 15 of the shield outer terminal 10 to the end of the shield braid 50, the braid joining portion 15 of the shield outer terminal 10, which has high rigidity, is provided on the shield braid 50 in an overlapping manner. Therefore, positioning accuracy of the overlapping portions can be improved, and a focus of the laser light 103 of the laser irradiation device 100 can be stably adjusted to an appropriate position.

As explained above, according to the braided part connection structure according to the embodiment, the braid joining portion 15 of the shield outer terminal 10, which has the high rigidity is overlapped on the shield braid 50, and the welded portions 17 of the braid joining portion 15 are laser-welded onto the shield braid 50. Therefore, the positioning accuracy of the overlapping portions can be improved. Therefore, as compared with a case where the shield braid 50 is provided on the shield outer terminal 10 in an overlapping manner and then the shield braid 50 is welded onto the shield outer terminal 10, the focus of the laser light 103 can be stably adjusted to be at an appropriate height. Accordingly, the braided part connection structure can be made highly reliable.

The welded portions 17 between the plurality of openings 13 formed in the braid joining portion 15 of the shield outer terminal 10 are laser-welded onto the shield braid 50. Therefore, according to the braided part connection structure of the embodiment, the volume of the welded portions 17 at which the shield outer terminal 10 is welded to the shield braid 50 can be scaled down, thereby reducing a heat capacity thereof. Therefore, heat energy applied when the shield braid 50 is welded can be prevented from being transmitted to a periphery of the welded portion 17 and escaping. As a result, the welded portions 17 of the braid joining portion 15 and the shield braid 50 can be efficiently joined together without increasing an irradiation time and output power of the laser light 103. As a result, a takt time of a connection process can be shortened, productivity can be improved, and cost can be reduced. Therefore, according to the braided part connection structure of the shield assembly 1 according to the embodiment, the shield outer terminal 10 and the shield braid 50 can form a highly reliable connection structure that is well joined along the circumferential direction.

Moreover, the openings 13 being notched holes are formed at the end of the shield outer terminal 10, and the welded portions 17 being protruding pieces are formed between the openings 13. Therefore, these protruding pieces can be laser-welded onto the shield braid 50 as the welded portions 17, and the shield outer terminal 10 and the shield braid 50 can be electrically connected with each other. Since the welded portions 17 are cantilevered protruding pieces, it is possible to prevent a decrease in a yield of the shield outer terminal 10. This is because the shield outer terminal 10 can be manufactured by punching out the protruding pieces in a pair of the shield outer terminals 10 at the same time when a metal plate is pressed to form the shield outer terminals 10.

In the embodiment explained above, although the shield outer terminal 10 is exemplified to have a circular cylindrical shape, the shield outer terminal 10, which is a shield member as a conductive member, is not limited to the circular cylindrical shape, and may be a polygonal cylinder shape.

Figure 6A:
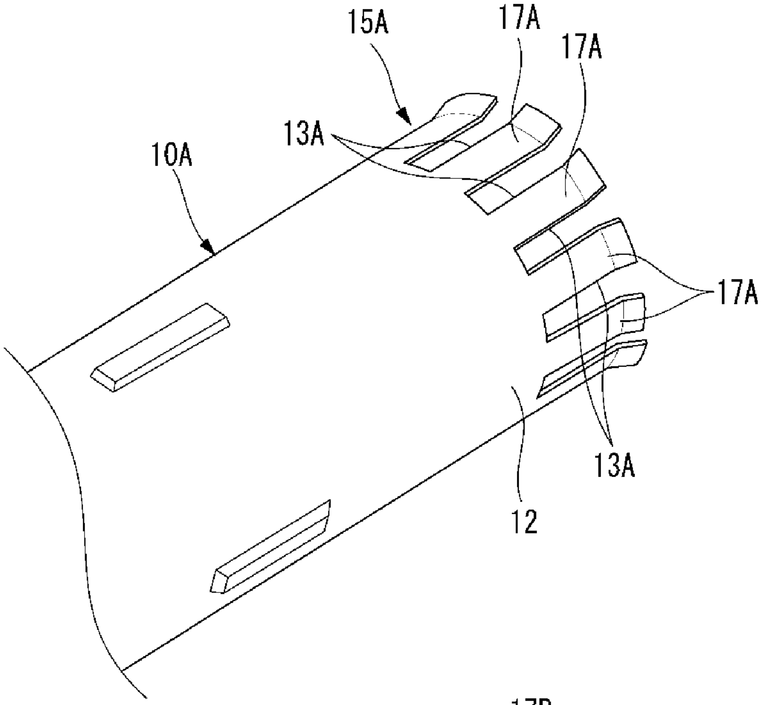
Figure 6B:
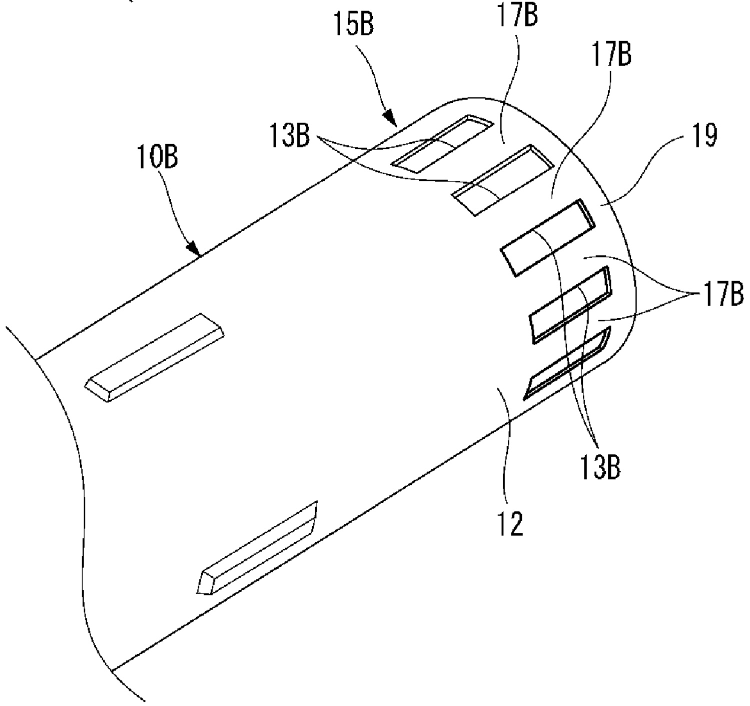

FIG. 6A and FIG. 6B are views illustrating a braided part connection structure according to modifications of the presently disclosed subject matter, in which FIG. 6A shows a main part perspective view illustrating a modification of the welded portion 17A in the shield outer terminal 10A, and FIG. 6B shows a main part perspective view illustrating another modification of the braid joining portion 15B in the shield outer terminal 10B.

As shown in FIG. 6A, the braid joining portion 15A of the shield outer terminal 10A includes the welded portions 17A formed between each two adjacent openings 13A along the circumferential direction of the shield outer terminal 10A. Each opening 13A of the braid joining portion 15A is a notched hole with an open end, and the welded portions 17A are cantilevered protruding pieces formed between each two adjacent notched holes. Moreover, a tip of each projecting piece is bent into a mountain shape that is convex toward an inner periphery of the shield outer terminal 10A.

Therefore, according to the braided part connection structure of the present embodiment, by bending the tip of the welded portion 17A, which is a cantilevered protruding piece, into the mountain shape, when the braid joining portion 15A is overlapped on the shield braid 50, the tips of the welded portions 17A are less likely to be caught, so that workability is improved.

As shown in FIG. 6B, the braid joining portion 15B of the shield outer terminal 10B is provided in the vicinity of an end of the braid connection end 12 of the shield outer terminal 10B. Openings 13B of the braid joining portion 15B are through holes formed in the vicinity of the end of the shield outer terminal 10B, and welded portions 17B are bridge pieces formed between each two adjacent through holes. In other words, the openings 13B are through holes provided closer to the braid connection end 12 than to the fitting end 11 of the shield outer terminal 10B.

Therefore, according to the braided part connection structure of the present embodiment, a plurality of openings 13B being through holes are formed in the vicinity of the end of the shield outer terminal 10B, and the bridge pieces are formed between the openings 13B. Therefore, the beam-shaped bridge pieces in which both ends of the pieces are supported having high rigidity can be welded on the shield braid 50 as the welded portions 17B, so that laser-welding can be stably performed.

In the above embodiment, although the conductive member is exemplified as the shield outer terminal 10, which is a shield member formed by being bent into a cylindrical shape, the conductive member is not limited to the cylindrical shield member, and may be a connection terminal including a braid joining portion formed in a plate shape.

Figure 7A:
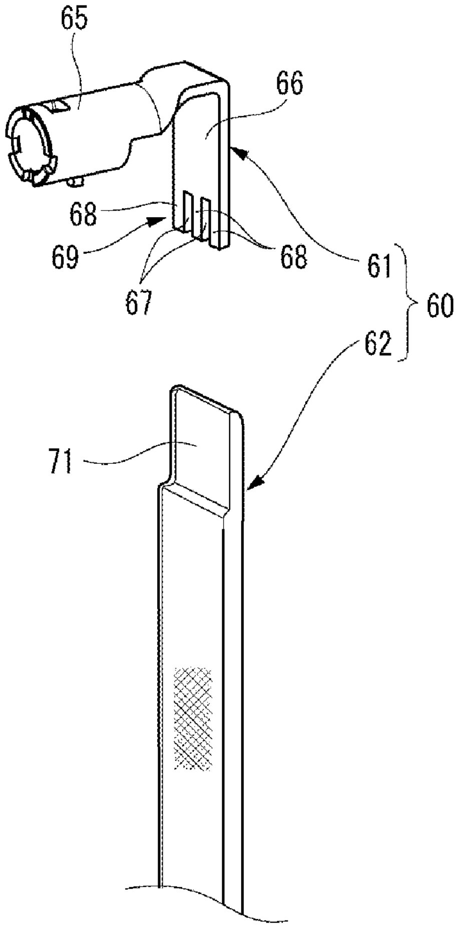
Figure 7B:
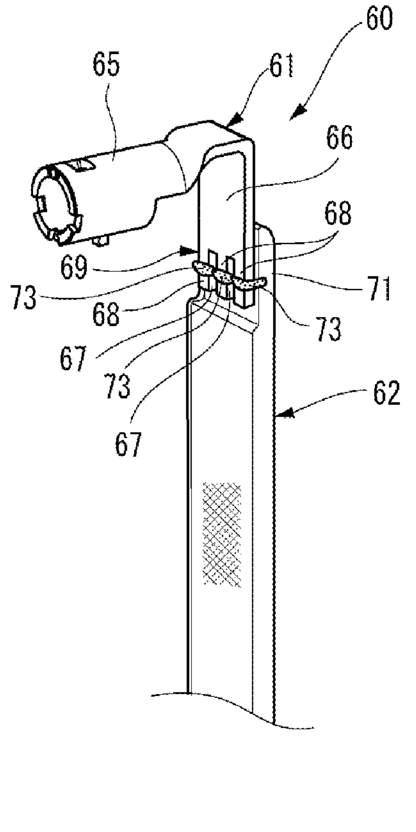

Next, a braided part connection structure according to another embodiment of the presently disclosed subject matter will be described, FIG. 7A and FIG. 7B are views illustrating the braided part connection structure according to the another embodiment of the presently disclosed subject matter, in which FIG. 7A shows a perspective view illustrating a connection terminal 61 as a conductive member and a flexible conductor 62 made of a braid separated from each other, and FIG. 7B shows a perspective view illustrating a state in which the connection terminal 61 and the flexible conductor 62 are joined together.

As shown in FIGS. 7A and 7B, the braided part connection structure according to the another embodiment includes the connection terminal (conductive member) 61 made of a female terminal and the flexible conductor 62. The flexible conductor 62 is made of a long braid. The connection terminal 61 and the flexible conductor 62 are accommodated in a housing (not shown) to form a connector. By fitting this connector into a counterpart housing of a counterpart connector, the connection terminal 61 and a counterpart terminal of the counterpart connector (not shown) are electrically connected with each other.

The connection terminal 61 is made of a conductive metal material such as, for example, copper or a copper alloy. The connection terminal 61 includes an electrical connection portion 65 and a braid connection end 66. The electrical connection portion 65 is formed in a cylindrical shape, and fits with a connection pin of the counterpart terminal (not shown) inserted therein. In this way, the connection terminal 61 and the counterpart terminal are electrically connected with each other. A braid connection end 66 is formed in a plate shape and is bent at a substantially right angle with respect to the electrical connection portion 65. The flexible conductor 62 is connected to the connection terminal 61 at the braid connection end 66.

The braid connection end 66 of the connection terminal 61 includes a braid joining portion 69 formed with a plurality of openings 67. The openings 67 are formed at intervals along a width direction of the connection terminal 61. The braid joining portion 69 includes welded portions 68 formed between each two adjacent openings 67 in the width direction. Each opening 67 of the braid joining portion 69 is a notched hole with an open end, and the welded portions 68 are cantilevered protruding pieces formed between each two adjacent notched holes. Therefore, the braid joining portion 69 is formed in a comb-teeth shape over the width direction. Widths along the width direction of the openings 67 and the welded portions 68 formed in the braid joining portion 69 of the connection terminal 61, and intervals between adjacent openings 67 and welding portions 68 are appropriately set depending on required strength, electrical resistance when being connected with the flexible conductor 62, and other conditions.

The flexible conductor 62 is a conductor made of a long braid obtained by braiding wires made of a conductive metal material such as copper or a copper alloy, and the like. The flexible conductor 62 includes a connection end 71 on one end side, which is joined to the braid connection end 66 of the connection terminal 61. At the connection end 71, the braid is formed into a flat plate. The flexible conductor 62 is electrically connected to an electric wire (not shown) via, a connecting member (not shown) at the other end opposite to the connection end 71.

The braid joining portion 69 of the braid connection end 66 of the connection terminal 61 is provided on the connection end 71 of the flexible conductor 62 in an overlapping manner. Then, in the braid joining portion 69 of the connection terminal 61 overlapped on the connection end 71 of the flexible conductor 62, welded connection portions 73 are formed by laser-welding the welded portions 68 made of the protruding pieces onto the connection end 71 of the flexible conductor 62. In this way, the connection terminal 61 and the flexible conductor 62 are electrically connected with each other at the welded connection portions 73, which are formed by laser-welding the welded portions 68.

According to the above connection terminal 61, for example, even if vibration is transmitted to the electric wire as an external force, the external force from the electric wire is absorbed by the flexible conductor 62 made of the braid, and is prevented from being transmitted to the connection terminal 61. In this way, the connection terminal 61 and the counterpart terminal are maintained in a good connection state.

Figure 8A:
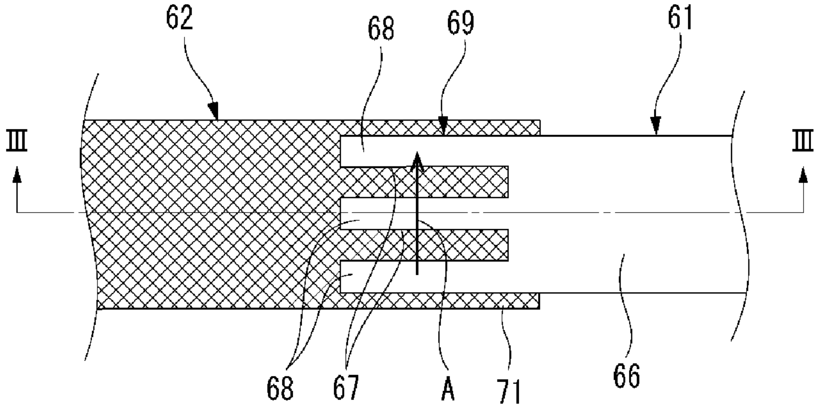
FIG. 8A is a plane view illustrating a state in which a braid connection end of the connection terminal is overlapped with a connection end of the flexible conductor.

Next, how the flexible conductor 62 made of the braid is connected to the connection terminal 61 will be described. FIG. 8A is a plane view illustrating a state in which the braid connection end 66 of the connection terminal 61 is overlapped with the connection end 71 of the flexible conductor 62, and FIG. 8B is a cross-sectional view taken along a line in FIG. 8A.

Figure 8B:
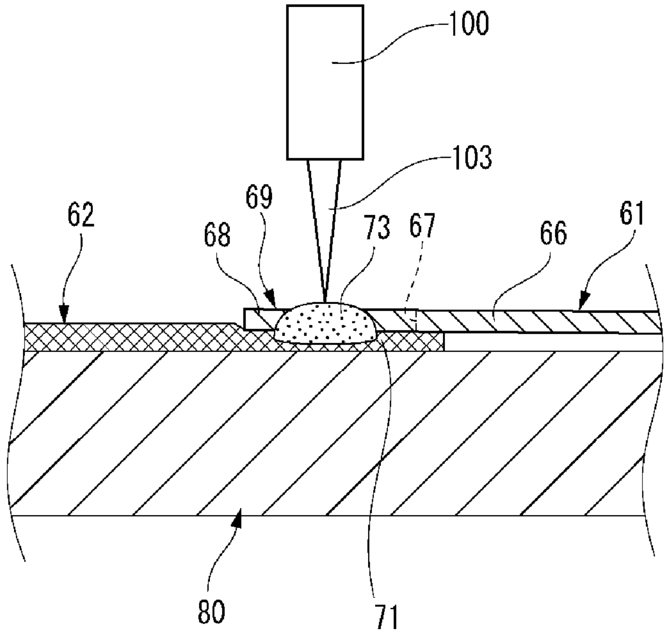
FIG. 8B is a cross-sectional view taken along a line III-III in FIG. 8A.

First, as shown in FIGS. 8A and 8B, the braid joining portion 69 of the braid connection end 66 of the connection terminal 61 is overlapped with the connection end 71 of the flexible conductor 62 placed on an irradiation work base 80 and fixed with a clamp or the like.

Next, as shown in FIG. 8B, an overlapping portion of each welded portion 68 of the braid joining portion 69 with the flexible conductor 62 is irradiated with the laser light 103 emitted by the laser irradiation device 100, and the welded portion 68 and the connection end 71 of the flexible conductor 62 are sequentially welded. In this case, the laser irradiation device 100 is turned on and off while the irradiation work base 80 is moved, so that an irradiation position of the laser light 103 moves relatively from one side to the other side of the width direction (for example, toward a direction indicated by an arrow A in FIG. 8A). Therefore, the laser light 103 can be irradiated only to the welded portions 68 of the braid joining portion 69. In this way, the overlapping portions of the welded portions 68 with the connection end 71 of the flexible conductor 62 are formed with the welded connection portions 73 by laser-welding the welded portions 68 onto the flexible conductor 62. As a result, the braid joining portion 69 of the braid connection end 66 of the connection terminal 61 is electrically connected to the connection end 71 of the flexible conductor 62 made of the braid.

As described above, according to the braided part connection structure according to the another embodiment, the braid joining portion 69 of the connection terminal 61 overlapped on the flexible conductor 62 made of the braid is laser-welded onto the flexible conductor 62. Therefore, the connection terminal 61 and the flexible conductor 62 can be well joined with each other to form a connection structure having high connection reliability.

The braid joining portion 69 of the connection terminal 61 having high rigidity is overlapped with and fixed to the flexible conductor 62 made of the braid placed on the irradiation work base 80, and the welded portions 68 of the braid joining portion 69 are laser-welded on the flexible conductor 62. Therefore, since positioning accuracy of the overlapping portion can be improved, the focus of the laser light 103 can be stably adjusted at an appropriate height, compared with a case where the flexible conductor is overlapped on the braid joining portion 69 of the connection terminal 61 and welded onto the braid joining portion 69 of the connection terminal 61. Therefore, the connection structure having the high connection reliability can be obtained.

The welded portions 68 between the plurality of openings 67 formed in the braid joining portion 69 of the connection terminal 61 are laser-welded onto the flexible conductor 62. Therefore, according to the braided part connection structure of the another embodiment, the volume of the welded portions 68 at which the flexible conductor 62 is welded to the connection terminal 61 can be scaled down, thereby reducing a heat capacity thereof. Therefore, heat energy applied when the flexible conductor 62 is welded can be prevented from being transmitted to a periphery of the welded portion 68 and escaping. As a result, the welded portions 68 of the connection terminal 61 and the flexible conductor 62 can be efficiently joined together without increasing the irradiation time and output power of the laser light. As a result, the takt time of the connection process can be shortened, the productivity can be improved, and the cost can be reduced. Therefore, according to the braided part connection structure of the another embodiment, the braid joining portion 69 of the connection terminal 61 and the connection end 71 of the flexible conductor 62 can be well joined with each other to form a connection structure having high connection reliability.

Moreover, the openings 67 being notched holes are formed at the end of the connection terminal 61, and the cantilevered protruding pieces are formed between the openings 67. Therefore, these protruding pieces can be laser-welded onto the flexible conductor 62 as the welded portions 68, and the connection terminal 61 and the flexible conductor 62 can be electrically connected with each other. Since the welded portions 68 are cantilevered protruding pieces, it is possible to prevent a decrease in a yield of the connection terminal 61. This is because the connection terminal 61 can be manufactured by punching out the protruding pieces in a pair of the connection terminals 61 at the same time when a metal plate is pressed to form the connection terminal 61.

While the presently disclosed subject matter has been described with reference to certain exemplary embodiments thereof, the scope of the presently disclosed subject matter is not limited to the exemplary embodiments described above, and it will be understood by those skilled in the art that various changes and modifications may be made therein without departing from the scope of the presently disclosed subject matter as defined by the appended claims.

According to an aspect of the embodiments described above, a braided part connection structure includes a conductive braid (for example, a shield braid 50, a flexible conductor 62) and a conductive member (for example, one of shield outer terminals 10, 10A, 10B, a connection terminal 61) electrically connected and fixed to the braid (the shield braid 50, flexible conductor 62) and made of a conductive plate material. The conductive member (one of the shield outer terminals 10, 10A, 10B, the connection terminal 61) includes a braid joining portion (15, 15A, 15B, 69). The braid joining portion (15, 15A, 15B, 69) includes, at a part of the conductive member in a longitudinal direction of the conductive member, a plurality of openings (13, 13A, 13B, 67) formed at intervals with each other along a direction intersecting the longitudinal direction and a welded portion (17, 17A, 17B, 68) defined by two adjacent openings (13, 13A, 13B, 67) of the plurality of openings (13, 13A, 13B, 67). The braid joining portion (15, 15A, 15B, 69) is provided on the braid (the shield braid 50, flexible conductor 62) in an overlapping manner and the welded portion (17, 17A, 17B, 68) is laser-welded onto the braid (the shield braid 50, flexible conductor 62).

According, to the braided part connection structure having the above-described configuration, the braid joining portion, which is a conductive member having high rigidity, is provided on the braid in an overlapping manner, and the welded portions of this braid joining portion are laser-welded onto the braid. Therefore, since the positioning accuracy of the overlapping portions can be improved, the focus of the laser light can be stably adjusted at an appropriate height, compared with a case where the braid is provided on the conductive member in an overlapping manner and welded on the conductive member. Therefore, the connection structure having the high connection reliability can be obtained. The welded portions between the plurality of openings formed in the braid joining portion of the conductive member are laser-welded onto the braid. Therefore, according to this braided part connection structure, the volumes of the welded portions, at which the braid is welded to the conductive member, are scaled down to reduce the heat capacity thereof, and heat energy applied when the braid is welded can be prevented from being transmitted to a periphery of the welded portion and escaping. As a result, the welded portions of the conductive member and the braid can be efficiently joined together without increasing the irradiation time and output power of the laser light. As a result, the takt time of the connection process can be shortened, the productivity can be improved, and the cost can be reduced.

The braid joining portion (15, 15A, 69) may be provided at an end of the conductive member (one of the shield outer terminals 10, 10A, connection terminal 61). The plurality of openings (13, 13A, 67) may be a plurality of notched holes formed at the end of the conductive member (one of the shield outer terminals 10, 10A, connection terminal 61), and the welded portion (17, 17A, 68) may be a protruding piece defined by two adjacent notched holes of the plurality of notched holes.

With this configuration, the openings made of notched holes are formed at the end of the conductive member, and the cantilevered protruding pieces are formed between the openings. Therefore, these protruding pieces can be laser-welded on the braid as the welded portions, and the conductive member and the braid can be electrically connected with each other. The shape of cantilevered protruding pieces can prevent a decrease in a yield of product since the conductive members can be manufactured easily by punching out the protruding pieces in a pair of the conductive members at the same time when a metal plate is pressed to form the conductive members.

The braid joining portion (15B) may be provided in the vicinity of an end of the conductive member (the shield outer terminal 10B). The plurality of openings (13B) may be a plurality of through holes formed in the vicinity of the end of the conductive member (the shield outer terminal 10B), and the welded portion (17B) may be a bridge piece defined by two adjacent through holes of the plurality of through holes.

With this configuration, the openings made of the through holes are formed in the vicinity of the end of the conductive member, and the bridge pieces are formed between the openings. Therefore, the double-supported beam-shaped bridge pieces having high rigidity can be welded on the braid as the welded portions, so that the laser-welding can be stably performed.

The conductive member may be a shield member (one of the shield outer terminals 10, 10A, 10B) formed by bending the conductive plate material into a cylindrical shape. The braid may be a cylindrical shield braid (50) configured to cover an electric wire (for example, an insulated wire 51) along a longitudinal direction of the electric wire. The braid joining portion (15, 15A, 15B) may cover an end of the shield braid (50) and the welded portion (17, 17A, 68) may be laser-welded onto an outer periphery of the shield braid (50).

With this configuration, the braid joining portion of the shield member formed by being bent into a cylindrical shape covers and overlaps on the end of the shield braid and is laser-welded. Therefore, the shield member and the shield braid can form the highly reliable connection structure that is well joined along the circumferential direction.

The conductive member may be a connection terminal (61) configured to be fitted and electrically connected to a counterpart terminal. The braid may be a flexible conductor (62) to which the braid joining portion (69) of the connection terminal (61) is connected. The braid joining portion (69) may be provided on the flexible conductor (62) in an overlapping manner and the welded portion (68) is laser-welded onto an end of the flexible conductor (62).

With this configuration, the braid joining portion of the connection terminal overlapped on the flexible conductor made of the braid is laser-welded on the flexible conductor. Therefore, the connection terminal and the flexible conductor can be well joined with each other to form the connection structure having high connection reliability.

Each of the welded connection portions 25, 73 can be referred to as a weld bead.

What is claimed is:

1. A braided part connection structure for a shielded cable, the shielded cable including an electric wire and an outer cover, the braided part connection structure comprising:

a conductive braid including a covered portion between the electric wire and the outer cover and an exposed portion exposed outside of the outer cover; and a conductive member electrically connected and fixed to the braid and made of a conductive plate material, wherein the conductive member includes a braid joining portion, a braid connection end, and a fitting end, the conductive member terminates at each of the braid connection end and the fitting end, and the fitting end is spaced away from the braid in a longitudinal direction of the shielded cable, wherein, the braid joining portion is disposed on the braid connection end, wherein the braid joining portion includes, at a part of the conductive member in the longitudinal direction, a plurality of openings formed at intervals with each other along a direction intersecting the longitudinal direction and a welded portion defined by two adjacent openings of the plurality of openings, wherein the braid joining portion is provided on the exposed portion of the braid in an overlapping manner and a laser weld bead connects the welded portion onto the exposed portion of the braid, and wherein the braid joining portion is spaced away from the outer cover.

2. The braided part connection structure according to claim 1, wherein the plurality of openings are a plurality of notched holes formed at the braid connection end of the conductive member, and wherein the welded portion is a protruding piece defined by two adjacent notched holes of the plurality of notched holes.

3. The braided part connection structure according to claim 1, wherein the plurality of openings are a plurality of through holes formed in the vicinity of the braid connection end of the conductive member, and wherein the welded portion is a bridge piece defined by two adjacent through holes of the plurality of through holes.

4. The braided connection structure according to claim 1, wherein the conductive member is a shield member formed by bending the conductive plate material into a cylindrical shape, wherein the braid is a cylindrical shield braid covers the electric wire along a longitudinal direction of the electric wire, and wherein the braid joining portion covers an end of the shield braid and the laser weld bead connects the welded portion onto an outer periphery of the shield braid.

5. A braided part connection structure comprising:

a conductive braid; and a conductive member electrically connected and fixed to the braid and made of a conductive plate material, wherein the conductive member includes a braid joining portion, wherein the braid joining portion includes, at a part of the conductive member in a longitudinal direction of the conductive member, a plurality of openings formed at intervals with each other along a direction intersecting the longitudinal direction and a welded portion defined by two adjacent openings of the plurality of openings, wherein the braid joining portion is provided on the braid in an overlapping manner and a laser weld connects the welded portion onto the braid, wherein the conductive member includes a connection terminal configured to be fitted and electrically connected to a counterpart terminal, the connection terminal is a hollow cylinder, wherein the braid is a flexible conductor to which the braid joining portion of the conductive member is connected and includes a flat end, wherein the braid joining portion is a flat plate and extends from the connection terminal at a right angle, wherein the braid joining portion is provided on the flat end of the flexible conductor in an overlapping manner and the laser weld connects the welded portion onto the flat end of the flexible conductor, and wherein the hollow cylinder includes an opened end, the conductive member includes an intermediate plate that extends from and is connected to the opened end, and the braid joining portion is connected to the intermediate plate and extends from the intermediate plate at the right angle.

* * * * *